United States Patent [19]
Desai et al.

[11] Patent Number: 5,958,499
[45] Date of Patent: *Sep. 28, 1999

[54] FLUIDIZED FAT

[75] Inventors: Girish Desai; Karin Rainey, both of Ellicott City, Md.; Jan Cornelissen; Cornelis Willem Van Oosten, both of Vlaardingen, Netherlands

[73] Assignee: Van den Bergh Foods Company, Division of Conopco, Inc., Lisle, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/606,611

[22] Filed: Feb. 26, 1996

[30] Foreign Application Priority Data

Oct. 25, 1995 [EP] European Pat. Off. ............ 95202895

[51] Int. Cl.⁶ ..................................... A23D 9/00
[52] U.S. Cl. ........................... 426/606; 426/612
[58] Field of Search .................. 426/609, 613, 426/604, 612, 606

[56] References Cited

U.S. PATENT DOCUMENTS

| | | |
|---|---|---|
| 3,071,475 | 1/1963 | Stohr . |
| 3,338,720 | 8/1967 | Pichel . |
| 3,472,661 | 10/1969 | Melnick et al. . |
| 4,375,483 | 3/1983 | Shuford .................. 426/613 |
| 4,385,076 | 5/1983 | Crosby .................... 426/613 |
| 4,399,165 | 8/1983 | Tack ........................ 426/613 |
| 4,572,836 | 2/1986 | Bakal . |
| 4,849,019 | 7/1989 | Yasukawa ............... 426/609 |

FOREIGN PATENT DOCUMENTS

| | | |
|---|---|---|
| 0 021 483 | 1/1981 | European Pat. Off. . |
| 0 045 504 | 2/1982 | European Pat. Off. . |
| 351122 | 1/1990 | European Pat. Off. . |
| 0 396 810 | 11/1990 | European Pat. Off. . |
| 0 536 976 | 4/1993 | European Pat. Off. . |
| 1904658 | 8/1970 | Germany . |
| 3816978 | 5/1987 | Germany . |
| 61-047165 | 3/1986 | Japan . |
| WO 94/08470 | 4/1994 | WIPO . |

*Primary Examiner*—Carolyn Paden
*Attorney, Agent, or Firm*—Matthew Boxer

[57] ABSTRACT

A FLUIDIZED fat composition is described which has an oil blend of 90–99.8 wt. % of an unhydrogenated liquid oil and 10–0.2 wt. % of a fully hydrogenated fat having an iodine value of less than 10 which forms a crystal network in the final composition. The composition optionally contains colors, flavorings, microcrystalline edible salt, essential oils, oleo and aqua resins, natural extractives in conjunction with herb and spices, cheeses and other seasonings, lecithin and antioxidants, starches, sugars, and other flavoring ingredients. It contains low saturated fatty acids and low to substantially no trans fatty acids.

10 Claims, No Drawings

FLUIDIZED FAT

FIELD OF THE INVENTION

The invention pertains to a pourable fat which is low in saturated fatty acids and also has low or is substantially free of trans fatty acids.

BACKGROUND OF THE INVENTION

Fluidized fat, also known as a liquid butter alternative, is pourable and useful for broiling, pan frying, grilling and sauteing, to name a few kitchen applications. Conventionally, these compositions are made from partially hydrogenated oils with added fully hydrogenated oils to meet certain fat solids profile. Thus, as such they are relatively high in both saturated fatty acids and trans fatty acids.

Therefore, it is an object of the present invention to provide a fat product in a pourable form which is both low in saturated fatty acids and is low or contains substantially no trans fatty acids with an ambient shelf life of at least 12 months. Optionally, the Fluidized fat products may also contain color, flavorings, salt, essential oils, oleo and aqua resins, natural extractives in conjunction with herb and spices, cheeses and other seasonings, lecithin and antioxidants.

SUMMARY OF THE INVENTION

The invention concerns a pourable fat composition which has a long shelf life and which comprises:

(a) 50 to 99 wt. % of a fat blend comprising
  (i) 90–99.8 wt. % of unhydrogenated liquid oil;
  (ii) 10–0.2 wt. % of fully hydrogenated fat having an iodine value of less than about 10 and that has the ability to form a crystal network in the end product. The fully hydrogenated fat preferably with less than 5 iodine value, being hardened canola oil or high erucic rapeseed oil, soybean oil, cotton seed oil and fish oil.
(b) up to 1.0% of lecithin, preferably acylated lecithin;
(c) 0–10 wt. % of microcrystalline edible salt;
(d) 0–45 wt. % of flavors and colors, herb and spices, nuts and seeds, sugar and starches and flavorings, essential oils, oleo and aqua resins, natural extractives in conjunction with herb and spices, cheeses and other seasonings,
(e) up to 5 wt. % of an anti-oxidant added to protect the flavor of the oil.

DETAILED DESCRIPTION OF PREFERRED EMBODIMENTS

The fat blend is present in the compositions in an amount of 50–99 wt. %, preferably 65–99.8 wt. %, more preferably 90–99.8 wt. %. The fat blend comprises 90–99.8 wt. % of an unhydrogenated liquid oil and 10–0.2 wt. % of a fully hydrogenated fat component. The oil displays a solid fat content (NMR pulse, not stab) of less than 10% at 20° C., preferably less than 5% at 20° C.

The liquid oil used in the invention is preferably selected from the group consisting of: canola oil, high oleic canola, sunflower oil, high oleic sunflower oil, safflower oil, high oleic safflower oil, soybean oil, corn oil, olive oil, cotton seed oil, peanut oil, arachidic oil, olein fractions of natural oils, such as palm oil olein, medium chain triglycerides MCT-oils. The liquid oil is unhydrogenated. Preferably the amount of liquid oil is 93–99, most preferably 94–96 wt. % in the fat blend.

The liquid oil displays a low saturated fatty acids content. Preferably canola, sunflower corn, peanut, olive, soybean and safflower oil are used. More preferably canola, safflower and sunflower oils are used which have less than 11% saturated fatty acids. Unhydrogenated refined liquid oil is used.

The hydrogenated or hard fat component of these blends must have the ability to form a fat crystal network in the compositions. This requirement is essential in order to produce stable compositions. Also in order to suspend the optional ingredients, for such ingredients to remain in suspension a fat crystal network is needed.

Examples of suitable fully hydrogenated fats are hardened sunflower seed oil, hardened soybean oil, hardened palm oil, hardened canola, hardened cottonseed, hardened fish oil hardened rapeseed oil or mixtures thereof. The best results were obtained, by using hard fats, having an I.V.<10, preferably less than about 5, most preferably less than about 2 I.V. Most preferred hard fats are fully hardened canola oil, soy oil, cottonseed and low erucic rapeseed oil.

The pourable character of the compositions is obtained because the fat blend of the liquid oil and the hard fat component have an apparent viscosity of 700–2500 cps after storage for 7 days at room temperature 20–22° C. The viscosity is measured by using Brookfield Viscometer Model # LVTD with spindle #3 and/or 4 at 60 RPM. The Brookfield reading is multiplied by a factor of 20 (if Spindle # 3 is used) and factor of 100 (if spindle # 4 is used) to obtain cps.

Antioxidants are used to protect flavorings. Preferably 200 ppm of TBHQ.

Optional Ingredients

Edible Salt

The edible salt of the invention can be derived from inorganic or organic acids or bases. The most preferred edible salt is NaCl. The particle size of the selected salt is critical so that microcrystalline salt which is finely ground must have an average particle size such that 95–99% passes through U.S.S. Mesh having a 44 Micron opening. The selected salt is present in the amount of 0–10 wt. %, preferably 0 to 5 wt. %, most preferably 0.6 to 1.9 wt. %.

Flavored Components

In contrast to the prior art the fat containing compositions of the invention are low in saturated fatty acids and trans fatty acids. The formulations are also low in cooking salt (or other inorganic and organic salts) (e.g., 2 wt. %) conventionally added for microbiological preservation and flavor.

Cheese particles of any type of conventional cheese may be ground to a particle size of from 0.05 to 2 mm, preferably 0.5 to 1 mm and added in an amount of from 5 to 15 wt. %.

Dried herb and spices in flake, powder and extract of spices along with powdered sugar and starches can be added to give certain flavor profiles. e.g., Fajita, Oriental, Italian, Pesto, etc. The amount of herbs and/or spices/powdered sugar and starches is 5–25 wt. %, more preferably 0–4 wt. %. The amount of nuts or seeds is preferably 10–20 wt. %, more preferably 12–15 wt. %.

The herbs and spices and cheeses are preferably dried, containing 2–10 wt. % of water. Also an extract of spices which is soluble in oil can also be added. Herbs and spices may also be used in frozen form. Flavorings, essential oils, oleo and aqua resins, natural extractives in conjunction with herb and spices and other seasonings may be added.

Spices are grouped into (a) tropical spices such as peppers and cloves, (b) herbs such as sage and rosemary, (c) spicy seeds such as mustard and anise and (d) dehydrated aromatic vegetables such as onion and garlic. A list of spices and other natural seasoning and flavorings, Essential Oils, aqua, oleo resins, natural extractives, and synthetic flavoring is found in Title 21, Section 182.10, 182.20, 182.40, 182.50 and 182.60 of the Code of Federal Regulations herein incorporated by reference and include the following nonlimiting examples:

| Common Name | Botanical Name and Plant Source |
|---|---|
| Alfalfa herb and seed | *Medicago saliva* L. |
| All spice | *Pimenta officinalis* Lindl. |
| Ambrette seed | *Hibiscus abelmoschus* L. |
| Angelica | *Angelica archangelica* L. or other spp. of Angelica. |
| Angelica root | Do. |
| Angelica seed | Do. |
| Angostura (cusparia bark) | *Galipea officinalis* Hancock. |
| Anise | *Pimpinella anisum* L. |
| Anise, star | *Illicium verum* Hook. f. |
| Balm (lemon balm) | *Melissa officinalis* L. |
| Basil, bush | *Ocimum minimum* L. |
| Basil, sweet | *Ocimum basilicum* L. |
| Bay | *Laurus nobilis* L. |
| Calendula | *Calendula officinalis* L. |
| Camomile (chamomile), English or Roman | *Anthemis nobilis* L. |
| Camomile (chamomile), German or Hungarian | *Matricaria chamomilla* L. |
| Capers | *Capparis spinosa* L. |
| Capsicum | *Capsicum frutescens* L. or *Capsicum annuum* L. |
| Caraway | *Carum carvi* L. |
| Caraway, black (black cumin) | *Nigella sativa* L. |
| Cardamon (cardamon) | *Elettaria cardamomum* Maton. |
| Cassia, Chinese | *Cinnamomum cassia* Blume. |
| Cassia, Padang or Batavia | *Cinnamomum burmanni* Blume |
| Cassia, Saigon | *Cinnamomum loureirii* Nees |
| Cayenne pepper | *Capsicum frutescens* L. or *Capsicum annuum* L. |
| Celery seed | *Apium graveolens* L. |
| Chervil | *Anthriscus cerefolium*, (L.) Hoffm. |
| Chives | *Allium schoenoprasum* L. |
| Cinnamon, Ceylon | *Cinnamomum zeylanicum* Nees. |
| Cinnamon, Chinese | *Cinnamomum cassia* Blume. |
| Cinnamon, Saigon | *Cinnamomum loureirii* Nees. |
| Clary (clary sage) | *Salvia sclarea* L. |
| Clover | *Trifolium* spp. |
| Coriander | *Coriandrum sativum* L. |
| Cumin (cummin) | *Cuminum cyminum* L. |
| Cumin, black (black caraway) | *Nigella sativa* L. |
| Elder flowers | *Sambucus canadensis* L. |
| Fennel, common | *Foeniculum vulgare* Mill. |
| Fennel, sweet (finocchio, Florence fennel) | *Foeniculum vulgare* Mill. var. *duice* (DC.) Alex. |
| Fenugreek | *Trigonella foenum-graecum* L. |
| Galanga (galangal) | *Alpinia officinarum* Hance. |
| Geranium | *Pelargonium* spp.r |
| Ginger | *Zingiber officinale* Rosc. |
| Grains of paradise | *Amomum melegueta* Rosc. |
| Horehound (hoarhound) | *Marrubium vulgare* L. |
| Horseradish | *Armoracia lapathifolia* Gilib. |
| Hyssop | *Hyssopus officinalis* L. |
| Lavender | *Lavandula officinalis* Chaix. |
| Linden flowers | *Tilia* spp. |
| Mace | *Myristica fragrans* Houtt. |
| Marigold, pot | *Calendula officinalis* L. |
| Marjoram, pot | *Majorana onites* (L.) Benth. |
| Marjoram, sweet | *Majorana hortensis* Moench. |
| Mustard, black or brown | *Brassica nigra* (L.) Koch. |
| Mustard, brown | *Brassica juncea* (L.) Coss. |
| Mustard, white or yellow | *Brassica hirta* Moench. |
| Nutmeg | *Myristica fragrans* Houtt. |
| Oregano (oreganum, Mexican oregano, Mexican sage, origan). | *Lippia* spp. |
| Paprika | *Capsicum annuum* L. |
| Parsley | *Petroselinum crispum* (Mill.) Mansf. |
| Pepper, black | *Piper nigrum* L. |
| Pepper, cayenne | *Capsicum frutescens* L. or *Capsicum annuum* L. |
| Pepper, red | Do. |
| Pepper, white | *Piper nigrum* L. |
| Peppermint | *Mentha piperita* L. |
| Poppy seed | *Papayer somniferum* L. |
| Pot marigold | *Calendula officinalis* L. |
| Pot marjoram | *Majorana onites* (L.) Benth. |
| Rosemary | *Rosmarinus officinalis* L. |
| Saffron | *Crocus sativus* L. |
| Sage | *Salvia officinalis* L. |
| Sage, Greek | *Salvia triloba* L. |
| Savory, summer | *Satureia hortensis* L. (Satureja). |
| Savory, winter | *Satureia montana* L. (Satureja). |
| Sesame | *Sesamum indicum* L. |
| Spearmint | *Mentha spicata* L. |
| Star anise | *Illicium verum* Hook. f. |
| Tarragon | *Artemisia dracunculus* L. |
| Thyme | *Thymus vulgaris* L. |
| Thyme, wild or creeping | *Thymus serpylium* L. |
| Tumeric | *Curcuma longa* L. |
| Vanilla | *Vanilla planifolia* Andr. or *Vanilla tahitensis* J. W. Moore. |
| Zedoary | *Curcuma zedoaria* Rosc. |

Additional flavor components can be selected from etherial oils, natural or nature identical flavor components. Color can be any natural and artificial, preferably B-carotene to give yellow butter like appearance.

Process

The invention is prepared by a process wherein (i) the oil blend is prepared by dissolving all oil soluble ingredients such as fully hydrogenated fat, antioxidants and emulsifiers such as lecithin etc. into heated unhydrogenated oil to form a uniform mixture.

(ii) the resulting mixture is heated to a temperature of at least 70° C. to dissolve substantially all the fat crystals.

(iii) the heated mix (ii) is cooled to a temperature of about 20° C. to form a cooled mixture containing some fat crystals; and (iv) the cooled mixture is gently mixed to form a network of fat crystals.

Optionally colors, flavorings, microcrystalline salt, essential oils, oleo and aqua resins, natural extractives in conjunction with herb and spices, cheeses and other seasonings are added to the formed fat network. It was found, that the best ambient stability was obtained if dried and oil soluble extract of spices are used.

The mixing according to step (iv) can be performed by any conventional mixing technique except it has to be gentle mixing to form a network. The cooling step was preferably in a scraped surface heat exchanger.

The following nonlimiting examples illustrate the invention.

EXAMPLE 1

2840 g. of unhydrogenated canola oil, 135 g. of fully hydrogenated canola stearine and 3 grams of lecithin were mixed and heated to 70° C. The mixture was cooled and passed through a votator then mixed gently to form the crystal network until a viscosity of 1200 cps was obtained. 21 grams microcrystalline salt, B carotene and flavors were then added and the product was collected.

EXAMPLE 2

To the product formed in Example 1 was added 4.7% garlic, onion, Italian seasoning and pepper. The spices were in dry form. The dry ingredients were mixed with agitation to form a stable Italian flavored product.

EXAMPLE 3

The following flavors were added to the product of Example 1 and mixed thoroughly to form an Oriental flavored product:

| Ingredient | % |
|---|---|
| Aqua Resin - Ginger | 1.0 |
| Sesame Oil | 5.0 |
| Garlic | 0.4 |
| Aqua Resin - Onion | 0.1 |
| Ginger Powder | 0.35 |
| Soy Flour | 4.4 |
| Powdered Sugar | 5.0 |
| Starch Supplied as Textra | 2.0 |
| Mustard Flour | 0.4 |
| White Pepper Ground | 0.30 |

We claim:

1. A pourable fat composition consisting of:
   (a) 50 to 99 wt. % of a fat blend consisting of:
      (i) 90–99.8 wt. % of unhydrogenated liquid oil;
      (ii) 10–0.2 wt. % of a fully hydrogenated fat having an iodine value of less than 10 which forms a crystal network in the pourable fat composition;
      (iii) about 0.1 wt. % to 0.084 wt. % lecithin;
      (iv) 0.6–1.9 wt. % of a microcrystalline edible salt having a particle size such that 95–99% of the salt passes through a U.S.S. Mesh with a 44 Micron opening,
   wherein the composition has a viscosity of about 500 to about 3000 cps at 22% and is stable at ambient temperature for at least 365 days.

2. A pourable fat composition according to claim 1, further comprising 0.5 to 45 wt. % of the total composition of a flavor ingredient.

3. A pourable fat composition according to claim 1, wherein the salt is a microcrystalline NaCl.

4. A pourable fat composition according to claim 1, wherein the oil blend has a solid fat content (NMR pulse, not stab), of less than 10% at 20° C.

5. A pourable fat composition according to claim 4, wherein the oil displays a solid fat content of less than 5% fat at 20° C.

6. A pourable fat composition, according to claim 1, wherein the liquid oil is selected from the group consisting of: canola oil, high oleic canola, sunflower oil, high oleic sunflower oil, safflower oil, high oleic safflower oil, soybean oil, corn oil, olive oil, cotton seed oil, peanut oil, arachidic oil, palm oil olein, MCT oils and mixtures thereof.

7. A pourable fat composition. according to claim 1, where in the liquid oil is Unhydrogenated.

8. A pourable fat composition according to claim 1, wherein the liquid oil is present in an amount of 93–99 wt. %.

9. A pourable fat composition according to claim 1, wherein the hydrogenated fat has an Iodine value of less than 5.

10. A pourable fat composition according to claim 1, wherein the fully hydrogenated fat is selected from the group of canola, soybean, cottonseed, rapeseed, sunflower, palm, fish oil and mixtures thereof.

* * * * *